(12) United States Patent
Carboni et al.

(10) Patent No.: US 12,275,547 B2
(45) Date of Patent: Apr. 15, 2025

(54) DEVICE AND PROCESS FOR FEEDING ARTICLES TO BE PACKAGED

(71) Applicant: G.D S.P.A., Bologna (IT)

(72) Inventors: Salvatore Carboni, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 130 days.

(21) Appl. No.: 17/998,583

(22) PCT Filed: Jul. 5, 2021

(86) PCT No.: PCT/IB2021/056003
§ 371 (c)(1),
(2) Date: Nov. 11, 2022

(87) PCT Pub. No.: WO2022/009067
PCT Pub. Date: Jan. 13, 2022

(65) Prior Publication Data
US 2023/0182944 A1 Jun. 15, 2023

(30) Foreign Application Priority Data

Jul. 9, 2020 (IT) .................. 102020000016675

(51) Int. Cl.
*B65B 5/06* (2006.01)
*B65B 5/10* (2006.01)
(Continued)

(52) U.S. Cl.
CPC .............. *B65B 35/58* (2013.01); *B65B 5/06* (2013.01); *B65B 5/105* (2013.01); *B65B 29/022* (2017.08);
(Continued)

(58) Field of Classification Search
CPC ......... B65B 5/06; B65B 5/105; B65B 29/022; B65B 35/24; B65B 35/26; B65B 35/38; B65B 35/58; B65G 47/1492; B65G 47/91
(Continued)

(56) References Cited

U.S. PATENT DOCUMENTS 6,002,125 A * 12/1999 Schubert ................ G01B 11/04
250/223 R
6,612,095 B2 * 9/2003 Hartness ................ B65B 21/183
198/470.1
(Continued)

FOREIGN PATENT DOCUMENTS

EP        2465783 A1    6/2012
IT    201700047487 A1   11/2018
WO   WO-2021053571 A1 *  3/2021 ............ B25J 9/003

OTHER PUBLICATIONS

US 2023/0331417 A1, Brand, Oct. 19 (Year: 2023).*
(Continued)

*Primary Examiner* — Douglas A Hess
(74) *Attorney, Agent, or Firm* — Steinfl + Bruno LLP (57) ABSTRACT

A device and a process for feeding articles to be packaged with a packaging apparatus are presented. The articles are transported on a first conveying line and can be arranged according to a desired pattern, which is repeated on a second conveying line from which the articles will be picked up in a subsequent station. For this purpose, at least one transfer device is provided for transferring the articles from the first conveying line to the second conveying line, with a self-moving transfer arm and a respective gripping device to pick up the articles. The gripping device has a plurality of gripping elements which are movable between a first configuration, in which the gripping elements are aligned with each other to grip the articles from the first conveying line, and a second configuration, in which at least two of the
(Continued)

gripping elements are staggered with respect to each other, to lay the articles according to a predetermined pattern.

21 Claims, 9 Drawing Sheets

(51) Int. Cl.
- *B65B 29/02* (2006.01)
- *B65B 35/24* (2006.01)
- *B65B 35/26* (2006.01)
- *B65B 35/38* (2006.01)
- *B65B 35/58* (2006.01)
- *B65G 47/14* (2006.01)
- *B65G 47/91* (2006.01)

(52) U.S. Cl.
CPC .............. *B65B 35/24* (2013.01); *B65B 35/26* (2013.01); *B65B 35/38* (2013.01); *B65G 47/1492* (2013.01); *B65G 47/91* (2013.01)

(58) Field of Classification Search
USPC ...................................................... 198/418.5
See application file for complete search history.

(56) References Cited

U.S. PATENT DOCUMENTS

| | | | | |
|---|---|---|---|---|
| 6,758,322 B2 * | 7/2004 | Monti | ................. | B65G 47/901 |
| | | | | 198/456 |
| 7,686,564 B2 * | 3/2010 | Kaiser | ................. | B65G 47/847 |
| | | | | 414/791.6 |
| 9,415,523 B2 * | 8/2016 | Agami | ................. | B26D 7/0658 |
| 9,802,765 B2 * | 10/2017 | Davies | ................... | B65G 47/53 |
| 11,001,400 B2 * | 5/2021 | Kalany | ................... | B65B 35/58 |
| 11,174,057 B2 * | 11/2021 | Dunkel | .................. | B65B 35/38 |
| 11,370,620 B2 * | 6/2022 | Amadori | .............. | B65G 47/908 |
| 11,535,458 B2 * | 12/2022 | Bonnain | ................. | B65B 21/06 |
| 11,772,833 B1 * | 10/2023 | Shi | ............................ | B65B 5/08 |
| | | | | 700/259 |
| 2012/0233967 A1 | 9/2012 | Bellante | | |
| 2017/0355478 A1 | 12/2017 | Lukes et al. | | |

OTHER PUBLICATIONS

International Search Report and Written Opinion for International Application No. PCT/IB2021/056003 filed on Jul. 5, 2021 on behalf of G.D S.P.A. Mail Date: Oct. 18, 2021 12 pages.

* cited by examiner

DEVICE AND PROCESS FOR FEEDING ARTICLES TO BE PACKAGED

CROSS REFERENCE TO RELATED APPLICATIONS

The present application is the US National Stage of International Patent Application No. PCT/IB2021/056003, filed on Jul. 5, 2021, which in turn, claims priority to Italian Application No. IT 102020000016675, filed on Jul. 9, 2020.

The present invention relates to a device and process for feeding articles to be packaged in a packaging apparatus and process.

The present invention finds a preferred, though not exclusive, application in the field of in-box packaging of loose articles, such as capsules for infusion products, for example coffee, a field to which reference may be made hereafter without loss of generality.

In particular, in this relevant technical sector, packaging apparatuses are known where the articles to be packaged are fed through special inlet lines and where they are subsequently arranged according to predefined configurations that allow them to be packed inside box-shaped packagings in the most compact manner.

In this description, and in the accompanying claims as well, certain terms and expressions are deemed to have, unless otherwise expressly indicated, the meaning expressed in the following definitions.

Here and hereafter, "article to be packaged" means an article intended to be packaged, in a certain number, in a container, such as a box or, in general, a packaging.

In particular, it is envisaged that, for this purpose, the articles to be packaged are arranged on a conveying line, which comprises at least two rows of articles to be packaged, according to a particular configuration. This configuration, referred to below as pattern, is the repetitive arrangement in which the articles to be packaged are positioned in said rows, and which is transferred to said packaging. An example of a predetermined pattern, by way of illustration, could be a checkerboard pattern.

The articles can be, for example, food and confectionery products already packaged in individual containers or wrappers, such as coffee capsules or other infusion drinks, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The articles may be identical to each other, or they can differ from each other for some characteristic of shape and/or appearance, such as the conformation, the composition, the colour or the orientation with respect to other articles to be packaged.

Again purely by way of example, an article to be packaged is represented by a capsule, i.e. a hollow element of round or cylindrical shape, having the function of a container, of wrapping, of casing, of protection, of covering or closing of a product contained within it, therefore possessing a predetermined shape, in which a head and a bottom are identified, which envisages that it is provided in an upright vertical arrangement, resting on its bottom on a transport plane defined by the respective conveying line, but which may possibly assume an upturned arrangement, always with respect to a vertical axis, resting on the head opposed to said bottom, where, on the conveying line, seats, such as recesses and/or supports, may be provided to maintain the element in the aforesaid arrangements, in particular where they do not have a bottom and/or a head suitable for acting as a stable support base on said transport plane.

One of these positions may be identified as a head-to-head upright arrangement, referred to as an upright arrangement for short, while the opposite position may be identified as a head-to-bottom upturned arrangement, referred to as an upturned arrangement for short.

It is understood that the use of two or more different arrangements may apply to any article to be packaged, in particular when the selected arrangements are intended to achieve an interlocking and/or a more compacted framing within a target packaging.

Inside the pattern, as defined above, the elements to be packaged constitute a compact assembly wherein the respective arrangements and/or types vary within that assembly, but they are equally repeated from assembly to assembly.

In case of capsules, they may be arranged in upright and upturned arrangements in the same predetermined pattern, or with capsules staggered and alternating with each other according to their respective upright or upturned arrangement.

It is understood that the articles to be packaged are continuously fed when they move at a predetermined speed, possibly variable, i.e. subject to acceleration and deceleration, but never nihil. Continuous feeding therefore differs from step feeding, in which the packaging articles move in a step-by-step motion.

A gripping element is defined as an element designed to grip, and thus pick up, and release one or more articles to be packaged, preferably a single article to be packaged, to transfer it from one conveying line to another conveying line.

The components of a group, such as gripping elements or articles to be packaged, are "aligned" with each other when such elements are arranged along a substantially straight ideal line, whereas they are "staggered" to each other when they are at least partially misaligned with respect to said ideal line. As a special case, the elements and/or articles are staggered when they are arranged in two or more straight lines which are distinct from each other, which for example may correspond to corresponding rows of a conveying line.

"Direct transfer path" means a path without intermediate stops, in which a quantity of articles to be packaged is transported from one conveying line to another conveying line.

This means that, along the transfer path, the articles to be packaged remain integral with the respective gripping elements that picked them up at one conveying line and then laid them on a second conveying line.

A transfer device is defined as a device designed to carry out a transfer of articles to be packaged between conveying lines, thereby said articles follow a transfer path.

A "number" of elements or articles means a quantity of elements or articles that is greater than or equal to two.

The Applicant observed that, generally, in a packaging process, the articles to be packaged like capsules are fed to a packaging apparatus all with the same arrangement, because in this way they come out, by way of example, from previous processes and/or apparatus for producing the same articles, but such a packaging process may require that a portion of the articles to be packaged be upturned, or that it must assume a different arrangement, or even a different arrangement of a portion of the flow of articles feeding the packaging apparatus, in a feeding path, to have, downstream of this path, articles to be packaged, and in particular capsules, in both the aforesaid arrangements, or in the arrangements that will be required in the packaging process, so that they can be compacted and/or interlocked in their final packaging.

In particular, the Applicant observed that this requirement is felt when, in the case of capsules, they have a substantially truncated conical or truncated pyramidal shape, or equivalent shapes, or other shapes that allow the upright and upturned capsules to be set together according to a predetermined arrangement.

Thus, when the capsules are fed at an inlet section in one or more rows, it is required that a portion of such capsules, possibly those of a portion of the rows if the latter are more than one, are upturned and then fed in a predetermined arrangement, in particular upright or upturned, on one or more subsequent rows of a corresponding first conveying line, from which the capsules, or other articles to be packaged, may be picked and then arranged on a respective second conveying line, on which the capsules are arranged upright and upturned according to a predetermined pattern, for example with capsules that are staggered and alternating with each other according to the respective upright or upturned arrangement.

The Applicant also verified that the conveying line-to-line transfer can be performed by pick-and-place robotic systems, but these, in order to achieve the desired target pattern, employ intermediate buffers where the capsules are stationary. Examples of such systems are described in US patent applications No. 2012/233967 A1 and 2017/355478 A1, which refer to packaging apparatuses in which the capsules move step by step.

However, the Applicant found that the use of these intermediate buffers tends to slow down the flow of capsules through the feeder device of the packaging apparatus, which therefore requires a multiplication of the rows in which the capsules are fed, to cope with the volumes that must be transferred at a certain speed.

In addition, the Applicant verified that the use of a stationary intermediate buffer generally implies the use of more robotic systems for the picking, the laying and the subsequent picking from the intermediate buffer and arrangement, complicating the overall structure of the packaging apparatus and increasing its overall dimensions.

As previously mentioned, the Applicant, however, understood that the problem herein outlined is common to any packaging of articles in differentiated shapes and arrangements, requiring the transformation of a feeding on conveying lines in which, for each row of this line, the articles to be packaged are homogeneous by type and/or arrangement, in a transport on different rows of a subsequent conveying line in which the articles previously on homogeneous lines are arranged according to a predetermined pattern which envisages staggered and/or alternating arrangements and/or types, or in which, on the subsequent conveying line, the articles are differentiated according to their type and/or arrangement.

The Applicant has therefore perceived that the drawbacks mentioned with reference to the prior art can be remedied by carrying out a transfer from a first conveying line to a second conveying line, in which the articles to be packaged, picked in a certain number from a single row of said first conveying line, are staggered to each other, so that they can be laid on different rows of the second conveying line.

The Applicant has finally found that a feeder device provided with a gripping device that picks up the articles to be packaged from a first conveying line and, during their transfer to the second conveying line, makes this mutual movement to stagger them, can arrange the articles to be packaged according to a predetermined pattern, without resorting to buffers or intermediate transfer stations.

In particular, according to a first aspect thereof, the invention relates to a feeder device for articles.

Preferably, said articles are articles to be packaged and said feeder device is provided for a packaging apparatus for said articles.

Preferably, said articles to be packaged are transported on a first conveying line.

Preferably, said feeder device comprises at least one transfer device for transferring the articles to be packaged from said first conveying line to a second conveying line.

Preferably, said at least one transfer device has a self-moving transfer arm.

Preferably, said at least one transfer device has a respective gripping device.

Preferably, said gripping device is moved by said self-moving transfer arm.

Preferably, said gripping device is provided to pick up said articles to be packaged from said first conveying line.

Preferably the gripping device comprises a plurality of gripping elements.

Preferably, said gripping elements are movable between a first configuration, in which they are aligned, and a second configuration, in which they are at least partially staggered.

Preferably, in said second configuration said gripping elements are provided to lay the articles to be packaged on said second conveying line according to a predetermined pattern.

Thanks to these features, it is possible to arrange the articles to be packaged, according to a desired pattern, which is repeated on said second conveying line from which the articles will be picked up at a subsequent station, and will then be laid in a packaging, for example a box-shaped packaging.

This arrangement can be achieved without the need to alter the conveying speed of the articles to be packaged, thus eliminating a potential bottleneck that could slow down the overall packaging process.

Furthermore, thanks to these features, it is possible to adopt a continuous transport mode, i.e. without step-by-step advancement and without stops on buffers or waiting or recirculation stations, for the elements to be packaged at any location of the feeder device.

According to a second aspect thereof, the invention relates to a process for feeding articles to be packaged that are transported on a first conveying line.

Preferably, said process comprises the step of transferring a number of said articles to be packaged from a section of said at least one first conveying line to at least two second conveying lines.

Preferably, said articles intended to be packaged are transferred through a direct transfer path.

Preferably, said articles to be packaged picked up from said first conveying line are at least partially staggered to each other, so as to be laid on at least two of said second conveying lines according to a predetermined pattern.

In other words, in order to obtain a predetermined pattern on the second conveying line, the process according to the present invention comprises a step in which a number of articles to be packaged, which are preferably transported consecutively in succession and on a section of a single row of the first conveying line, are picked up and transferred to the second conveying line, with a direct transfer path, during which the articles to be packaged are at least partially staggered to each other, so that they can be laid on several rows of the second conveying line according to the chosen pattern.

In a third aspect thereof, the present invention relates to a packaging apparatus comprising a feeder device for articles according to the first aspect.

In other words, this apparatus comprises a feeder device for articles to be packaged, in which the latter are fed on a first conveying line in one or more rows which are homogeneous with each other, in which a gripping device picks up a number of articles from one of these rows and, while transferring them to the second conveying lines, arranges them according to an at least partially staggered pattern, moving the single gripping elements within it.

In at least one of the aforesaid aspects, the present invention may further comprise at least one of the following preferred features.

In a preferred embodiment of the present invention, the feeder device has an inlet section in which the articles to be packaged are fed on a number of rows of an inlet line.

Preferably, in said inlet line each article to be packaged has the same arrangement, in particular an upright arrangement.

Preferably, the feeder device comprises an upturning equipment providing for continuously upturning a portion of the articles to be packaged.

Preferably, the upturning equipment acts on one of said inlet rows, so as to obtain, from said inlet line, a corresponding row or more rows of the first conveying line with articles to be packaged with said upright arrangement, and one or more rows of the first conveying line with articles to be packaged with an upturned arrangement.

Furthermore, in a preferred embodiment of the present invention, said upturning equipment comprises, for each row of the inlet line in which the articles to be packaged are upturned, a respective screw conveyor.

Preferably, said screw conveyor is cylindrical and rotates at a predetermined speed.

Preferably, said screw conveyor has a groove provided according to a helix principle with an inlet end, which continuously receives the articles to be packaged from the inlet line.

Preferably, said upturning equipment comprises a fixed guide cooperating with said screw conveyor.

Preferably, said fixed guide extend with helical shape around said screw conveyor over an angular extent of approximately 180°, so as to receive the articles intended to be packaged in an upright arrangement and to release them in an upturned arrangement.

Preferably, the feeder device comprises a spacer equipment for articles to be packaged, fed continuously and adjacent to each other, according to a predetermined spacing.

In this way, possibly with the help of receiving seats on the conveying lines, the articles intended to be packaged can be provided at the right spacing so that they can be gripped simultaneously by said gripping elements.

Further, in a preferred embodiment of the present invention, said spacer equipment comprises, on each inlet line, a respective cylindrical screw conveyor rotating at a predetermined rotational speed, with a groove provided according to a helix principle with an inlet end and turns with a predetermined spacing, continuously receiving the articles to be packaged from the inlet line, and an outlet end whereabouts the articles to be packaged are spaced apart from each other.

Preferably, the screw conveyors of the upturning equipment and the spacer equipment coincide.

In a preferred embodiment of the present invention, the feeder device has a number of rows of the inlet line which coincides with the number of rows of the first conveying line.

More preferably, there are two inlet lines and two first conveying lines, said upturning equipment acting on one of the inlet lines.

Preferably, the number of rows in the first conveying line coincides with the number of rows in the second conveying line.

Preferably, said pattern is a checkerboard pattern.

Preferably, in the above-mentioned inlet line, the articles to be packaged are fed continuously without interruption between one article and another, and with an upright arrangement.

In the example of the capsules, on one row of the first conveying line the capsules are resting on their bottoms, while on another row of the first conveying line they are resting on their heads.

From this configuration, it is then possible to obtain a pattern on the second conveying line, in which articles to be packaged, possibly all belonging to the same type, are in an upright arrangement or upturned arrangement, alternating with each other.

Preferably, the first conveying line and the second conveying line are arranged parallel with and close to each other.

Preferably, the first conveying line and the second conveying line have a concordant transport direction.

Preferably, there is provided more than one transfer device in the feeder device, in particular two transfer devices for the articles to be packaged, arranged in succession.

Preferably, one gripping device may be provided for each row of the first conveying line while, according to another variant, the transfer devices may operate indifferently on any row of the first conveying line: in the first case, each transfer device may possibly be provided with dedicated gripping elements for the arrangement and/or for the type of articles to be packaged and picked up, while in the second case each transfer device may possibly be provided with gripping elements capable of picking up the articles to be packaged for any arrangement and/or for the type of articles to be packaged.

Preferably, said gripping elements are of the suction type.

Preferably, each of said gripping elements is intended to pick up a single article to be packaged.

Preferably, said first conveying line transports articles to be packaged continuously.

According to a preferred example embodiment of the present invention, each article to be packaged is fed to a plurality of rows of the first conveying line from a corresponding number of rows of the inlet line in the same upright arrangement.

Preferably, it is envisaged to upturn the articles to be packaged transported from one portion of the rows of the inlet line, obtaining, in said first conveying line, articles to be packaged in an upright arrangement and articles to be packaged in an upturned arrangement on respective rows.

Preferably, said articles to be packaged, in said inlet line, are continuously fed, and it is provided that the articles to be packaged are spaced uniformly on the first conveying line in which they are continuously transported.

In a preferred example embodiment of the present invention, it is provided that said step of continuously upturning the articles to be packaged of a portion of the rows of the inlet line takes place at the same time as the step of spacing, on these rows, the articles to be packaged according to a predetermined spacing.

The characteristics and advantages of the invention will become clearer from the detailed description of an embodiment illustrated, by way of non-limiting example, with reference to the appended drawings wherein.

In the accompanying figures, 100 indicates as a whole a packaging apparatus for articles 1, comprising a feeder device 300 made in accordance with the present invention.

The embodiment below described is referred to articles to be packaged in a packaging, in particular a box-shaped packaging 30 in which articles that are different from each other, or the same but in different configurations, are arranged in a sorted manner, for example arranged on superimposed layers.

Figure 12:
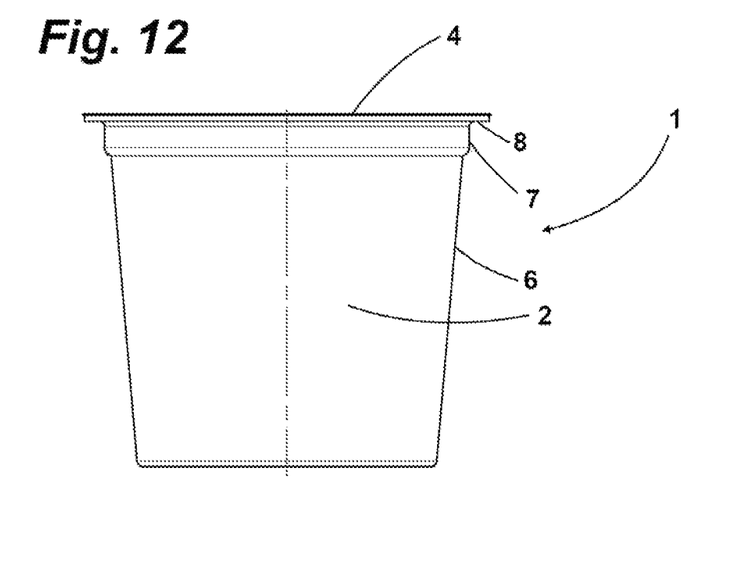
FIG. 12 shows an elevation view of an article to be packaged.
Figure 13:
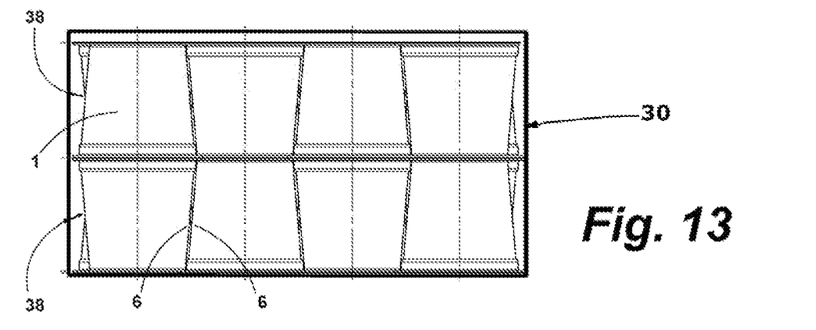
FIG. 13 shows a side view illustrating the arrangement of the articles to be packaged in a box-shaped package.
Figure 14:
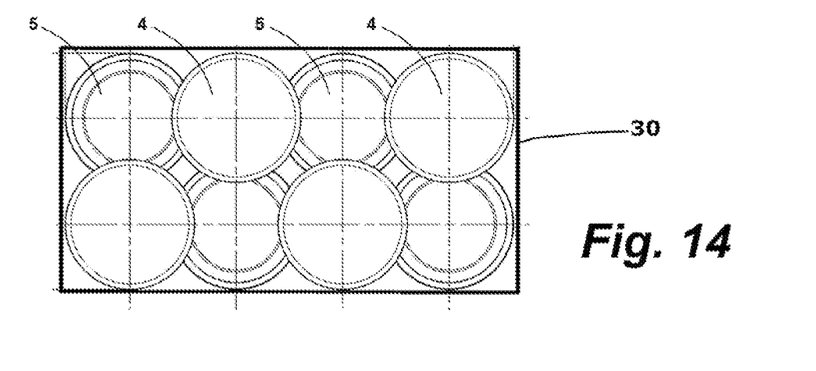
FIG. 14 shows a view from above illustrating the arrangement of the articles to be packaged in the box-shaped packaging of FIG. 13.

In this example, with reference to FIGS. 12 to 14, a particular article to be packaged for non-limiting purposes, namely a capsule 1, is contemplated, such as a capsule to produce beverages by infusion.

The capsule 1 is formed by a substantially rigid casing 2, which has a mouth 3 closed by a lid 4 that, in the present example, is a laminar element that is adhered to the edges of this opening by gluing. The mouth 3 and the lid make a head 4 of the capsule 1, which is opposed to the bottom 5, which will be described below.

The lid 4 is applied to the casing 2 after the latter has been filled.

The casing 2, in the present example, may have a cup shape, i.e. a truncated cone shape having a bottom 5 at the smaller base thereof and inclined walls 6, with a slight flaring, and a top at which said mouth 3 is defined by a circular top edge 7 which has a protruding border 8 or shoulder on the top circumference.

Both the bottom 5 and the top lid 4 are substantially flat, so that the casing 2, i.e. the capsule, can assume a first upright bottom-to-head arrangement, in which the casing 2 rests on the bottom 5, and a second upturned head-to-bottom arrangement, in which the casing 2 rests on the lid 4, i.e., on the circular top edge 7 to which the lid 4 is applied.

The packaging apparatus 100 is fed with a semi-finished product for the forming of the box-shaped packagings 30 in which the articles to be packaged will be arranged, which, in the present example, is a flat blank made of foldable and semi-rigid material, such as a cardboard suitably cut and provided with folding lines, determined by creasing, to form the walls of a box-shaped packaging 30.

Inside the box-shaped packaging 30, the articles to be packaged are arranged on superimposed layers 38, one of which is located at the bottom of the box-shaped packaging 30.

If the articles to be packaged are different from each other, in particular if they are of two different types, each layer will be formed in such a manner that the different articles are arranged according to a predetermined pattern (FIGS. 13 and 14).

On the other hand, if the articles to be packaged are identical between them but arranged in different arrangements, in particular in two different arrangements, each layer will be formed in such a manner that the articles in different configurations are arranged according to a predetermined pattern.

In the example described herein, where the articles to be packaged are capsules 1 of the shape described above, they will be arranged in the box-shaped packaging 30 in two different arrangements: the aforesaid upright arrangement and the aforesaid upturned arrangement.

In a preferred version of this embodiment, the two configurations will be arranged in each layer 38 in a checkerboard pattern, wherein each element 1 in an upright configuration is laterally flanked by elements 1 in an upturned configuration, and vice versa.

In this way, each layer 38 may assume a compact configuration in which the inclined walls 6 of adjacent capsules 1 adhere (or they are very close) to each other. It is understood, however, that the checkerboard pattern is only one of the possible patterns, which may also include honeycomb patterns, or other patterns suitable for particular shapes of the articles to be packaged.

In a preferred version of this embodiment, the capsules 1 of superimposed layers 38 in contact with each other are arranged, within the respective pattern, with the bottoms 5 of capsules 1 of different layers in contact with each other, and with the lids 4 of capsules 1 of different layers in contact with each other. For example, this can be achieved by alternating layers 38 in a checkerboard pattern, in which superimposed capsules 1 in upright configuration and in upturned configuration are alternated from layer to adjacent layer.

In a preferred version of this embodiment, referring in particular to capsules 1 having a circular top edge 7 with a protruding border 8 or shoulder on the top circumference, the capsules 1 of each layer 38 are arranged staggered to each other at a spacing substantially equal to the height of the protruding border 8. In this way, in a compact configuration, such as that obtained with the superposition of layers with a checkerboard pattern as described above, the bottom 5 of the capsules 1 will rest on the protruding border of the adjacent capsules, so as to achieve a more compact configuration.

The above-described compact configurations allow a certain number of capsules to be allocated in smaller box-shaped packagings 30, with clear advantages in terms of less space occupied.

The packaging apparatus 100 provided for both forming the box-shaped packagings 30 and filling them with articles to be packaged, particularly but not exclusively the capsules 1 described above, to obtain a finished packaging intended to be packaged for shipment.

For this reason, the packaging apparatus 100 of the present example embodiment is fed with stacks of blanks and with capsules 1, which are supplied in an upright configuration at an inlet section 101.

More in detail, the apparatus 100 has a first forming line which is fed at a first inlet end thereof 102 with blanks by means of a feeding station 103; this first forming line assumes a U-shaped configuration by travelling along a curve on a rotating forming carousel 125, which comprises a plurality of forming devices 150.

The feeding station 103 performs the extraction of single blanks and is connected to a folding station 104 in which the blanks are arranged in a configuration in which they are sent on a blanks conveyor 105. In the folding station 104 the blanks undergo a preliminary folding of the panels and of the flaps that form the blank. In addition, they are correctly spaced apart from each other, also in view of their format, which may vary according to the box-shaped packaging 30 which is to be made.

The blanks conveyor 105 travels through a gluing station 106 in which a plurality of hot glue guns lay appropriate glue spots on appropriate flaps of the blanks. It feeds the forming devices 150 rotating on the forming carousel 125, so that each forming device 150 intersecting the final section of the blanks conveyor 105 receives a respective blank in the correct position and already provided with the necessary glue spots.

In the curved section of the forming line, the forming devices 150 form respective box-shaped packagings 30 by means of folding operations of the panels forming the blank, adhering the flaps provided with glue to some of the panels thereof in an appropriate manner. At the end of the curved section of the first forming line, the box-shaped packagings 30 are fed onto a packagings conveyor 107 which provides for an opening station 108 of an openable wall of the box-shaped packaging 30, which must remain in an upright position, with the opening free of obstacles, until filling is complete.

The packagings conveyor 107 follows a rectilinear path in which the single box-shaped packagings 30 are filled with layers of articles to be packaged, which are transferred therein by a plurality of robotic filling devices 200, arranged in line alongside the packagings conveyor 107 and supported by an overlying cage frame 109. Once the filling is complete, the filled box-shaped packagings 30 arrive at a closing station 110. Subsequently, the closed box-shaped packagings 30 reach a discharge end 111, from where they are sent to a packaging apparatus.

As anticipated above, the packaging apparatus 100 has a second inlet section at which the capsules are fed in an upright configuration in a substantially unsorted manner.

Figure 1:
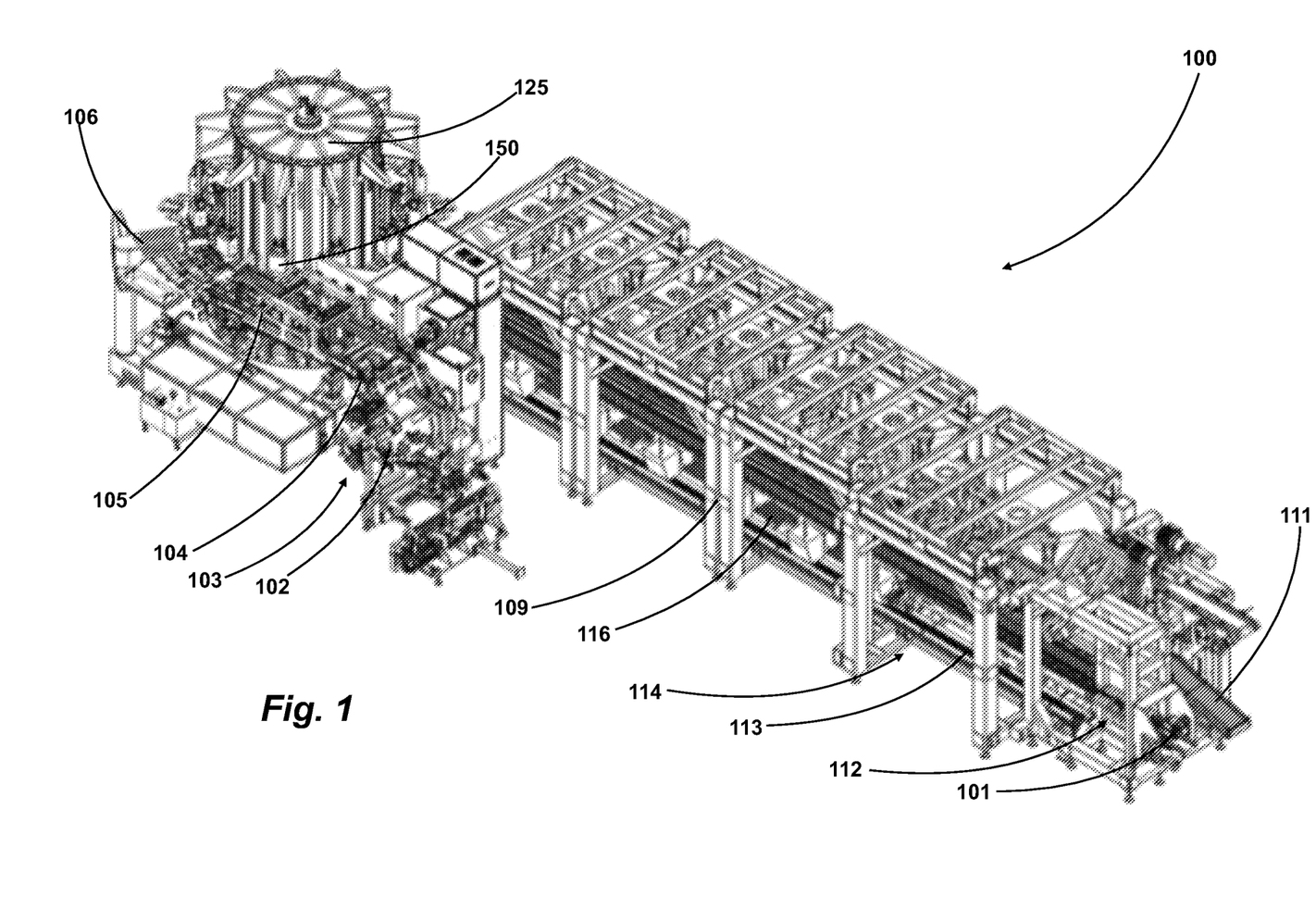
FIG. 1 shows a first perspective view of an example of an embodiment of a packaging apparatus comprising a feeder device for articles to be packaged made according to the present invention.
Figure 2:
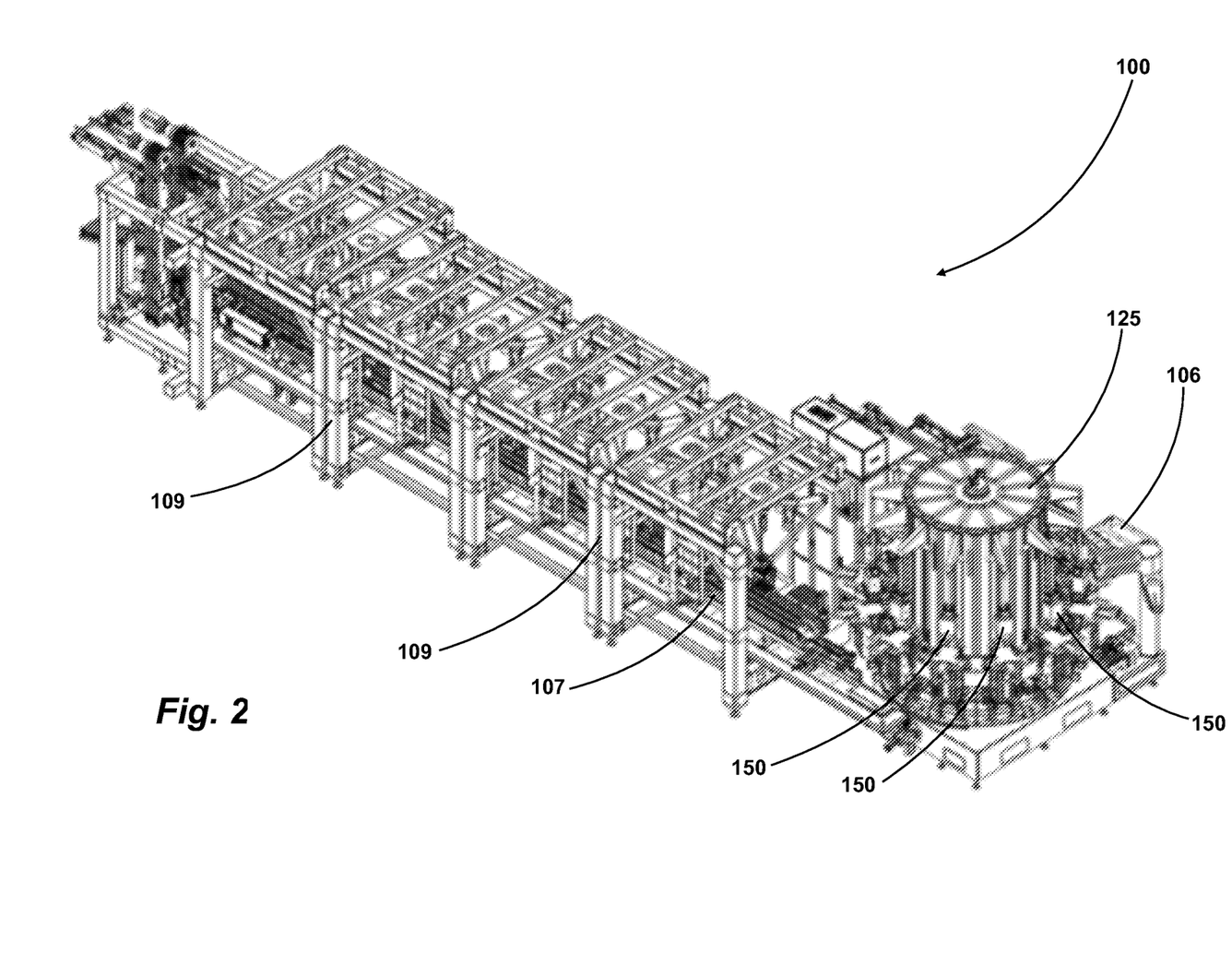
FIG. 2 shows a second perspective view of the packaging apparatus of FIG. 1, from a different point of view to that of the previous figure to show the opposite side.
Figure 3:
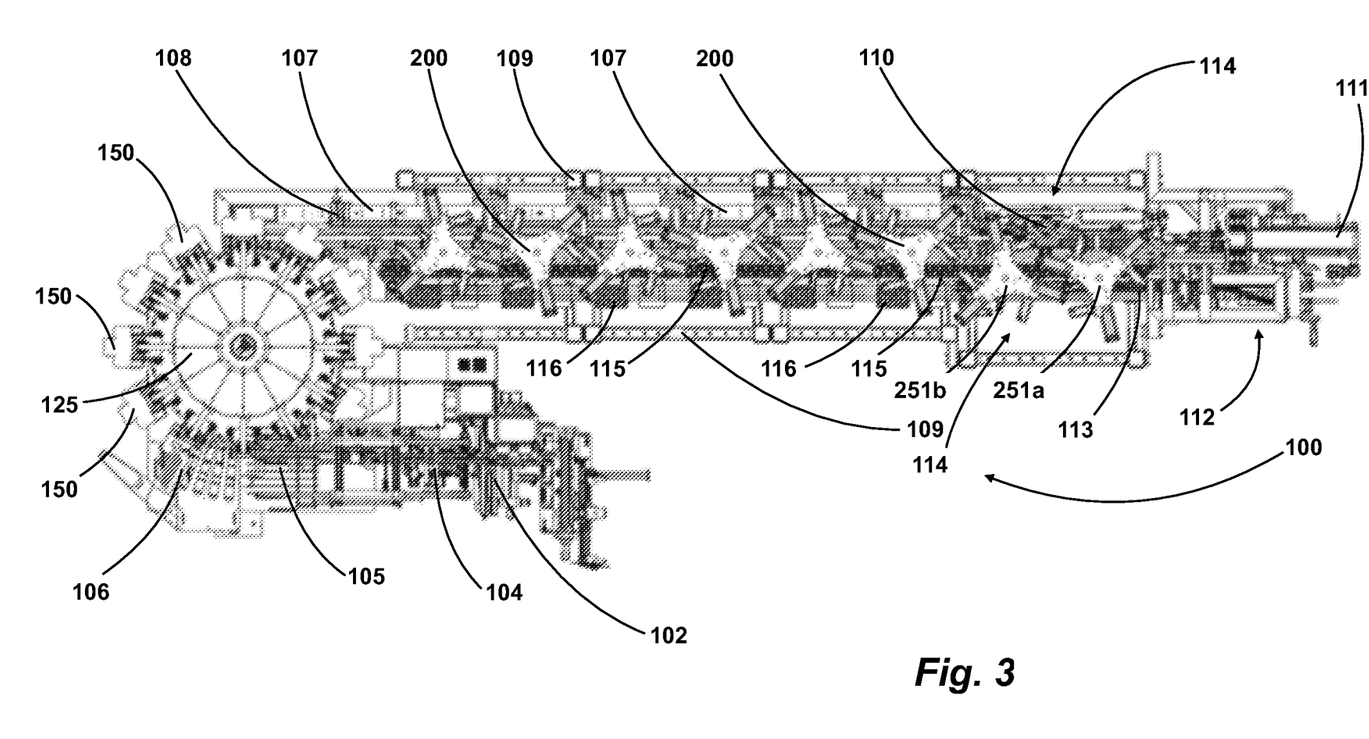
FIG. 3 shows a plan view from above of the packaging apparatus in FIG. 1.
Figure 4:
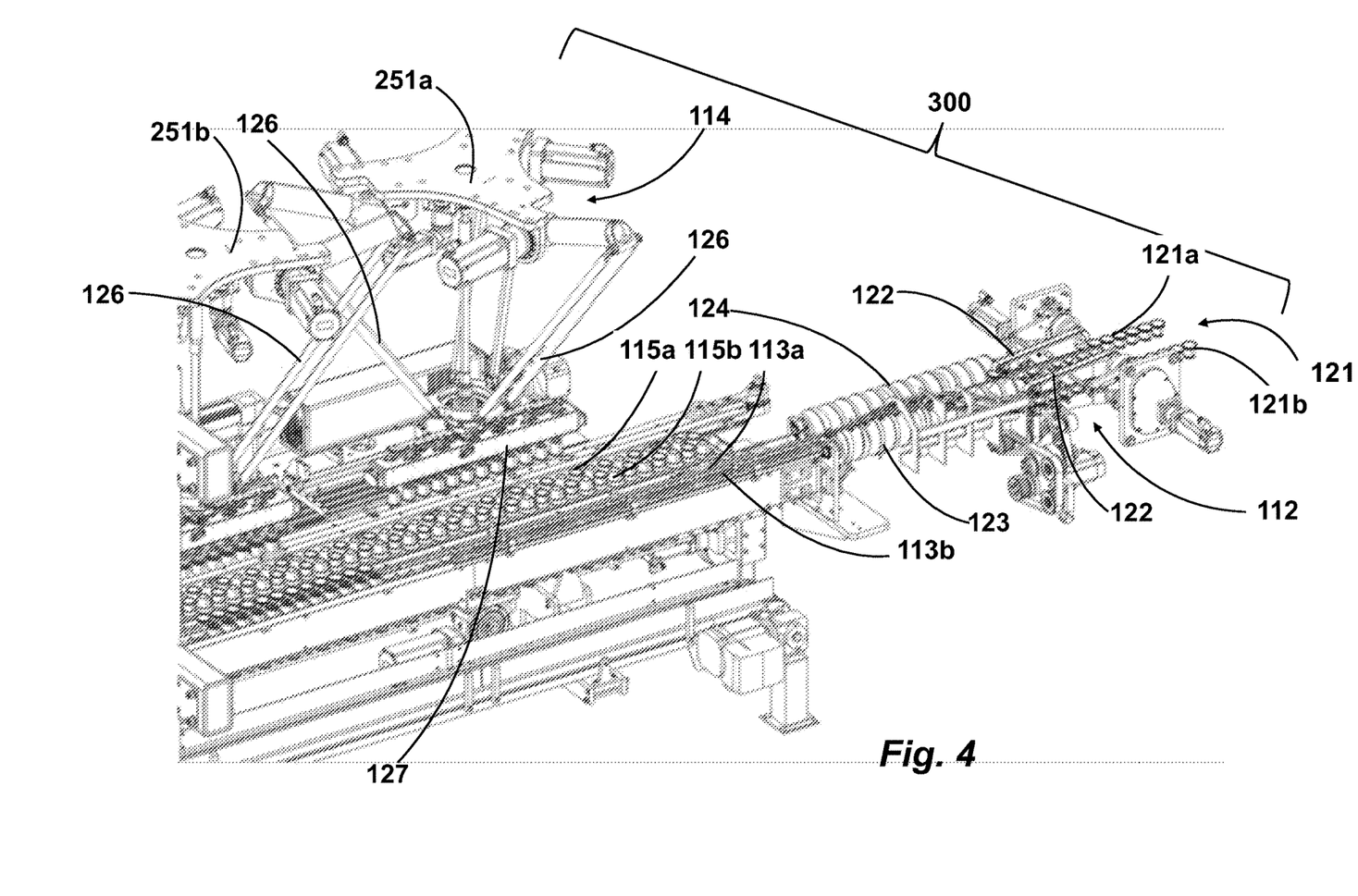
FIG. 4 shows an overall perspective view of the feeder device from the previous figures.
Figure 5:
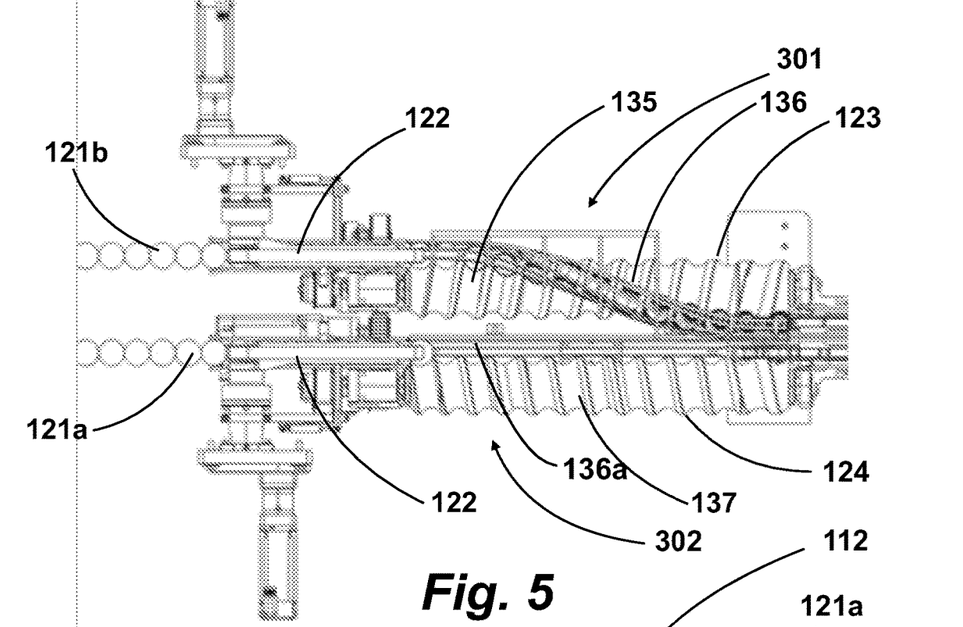
FIG. 5 shows a top view of a first portion of the feeder device of FIG. 4.
Figure 6:
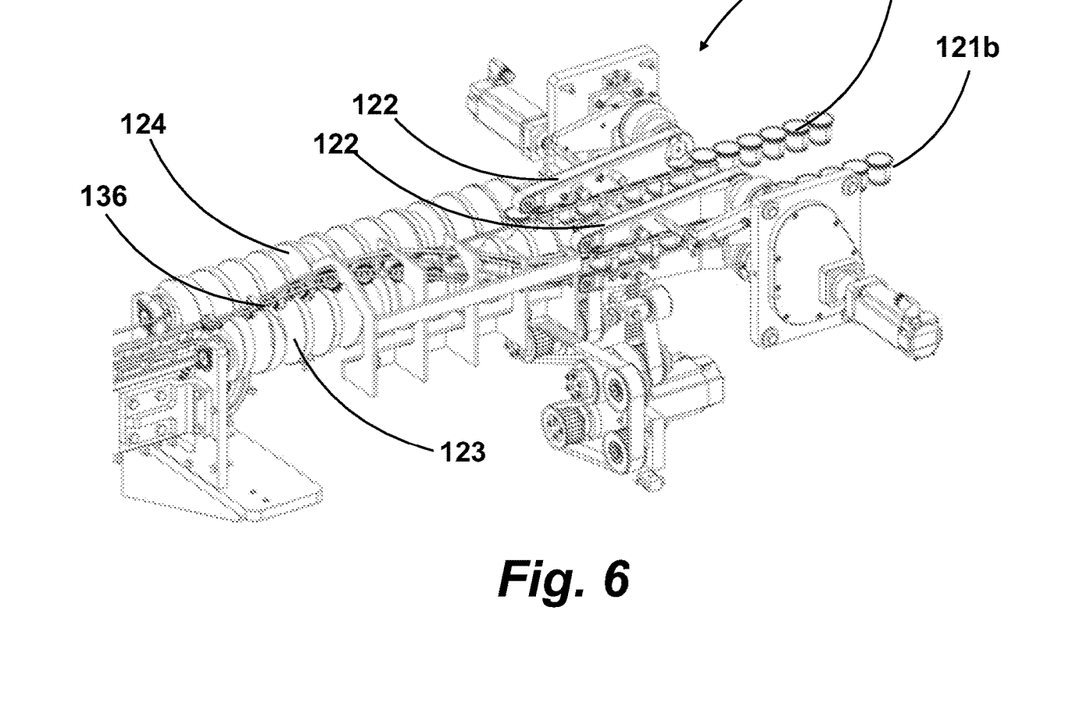
FIG. 6 shows a perspective view of the portion of the feeder device of FIG. 4.
Figure 7:
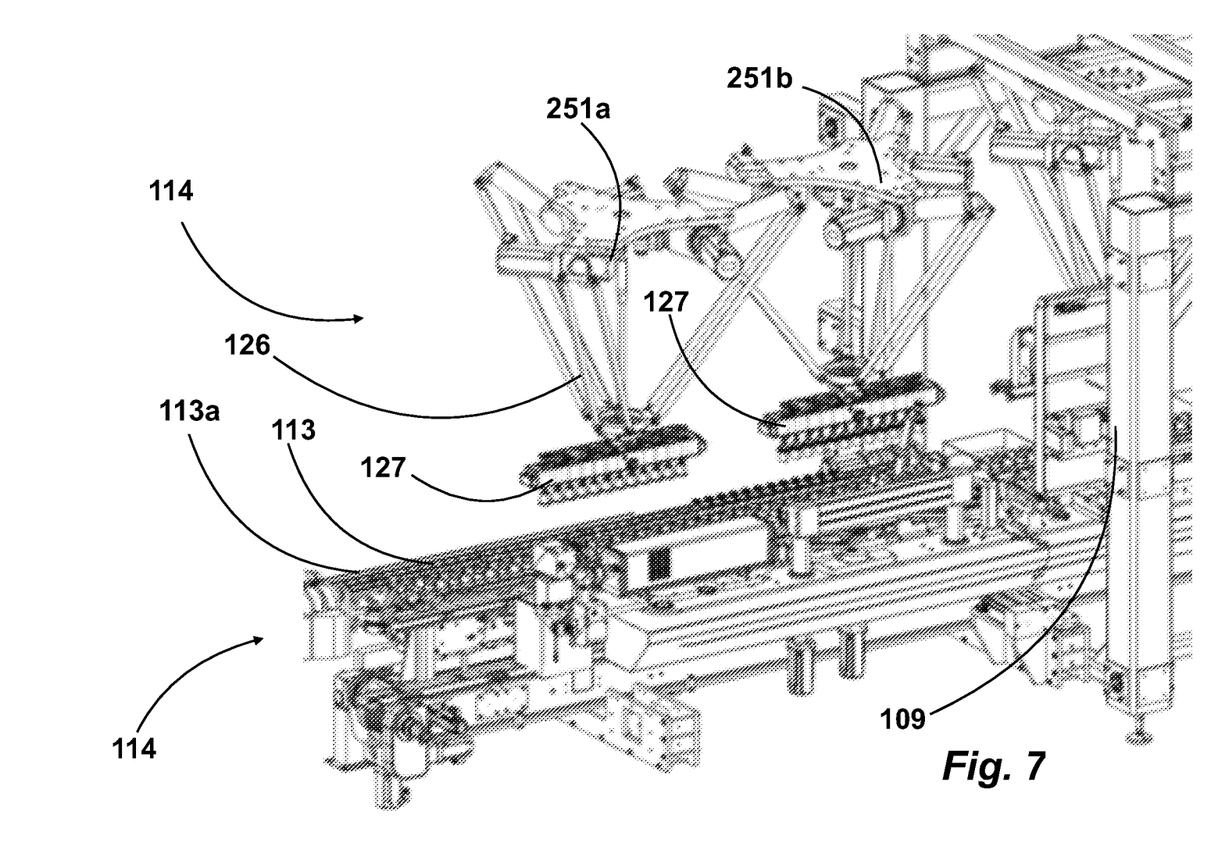
FIG. 7 shows a perspective view of a second portion of the feeder device of FIG. 4.
Figure 8:
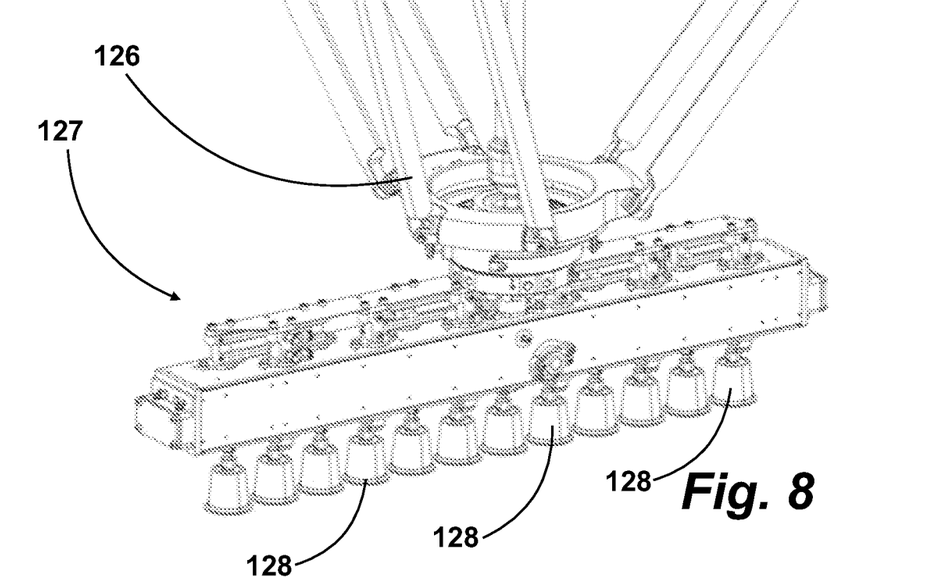
FIG. 8 shows a perspective view of a transfer device of the feeder device of FIG. 4.
Figure 9:
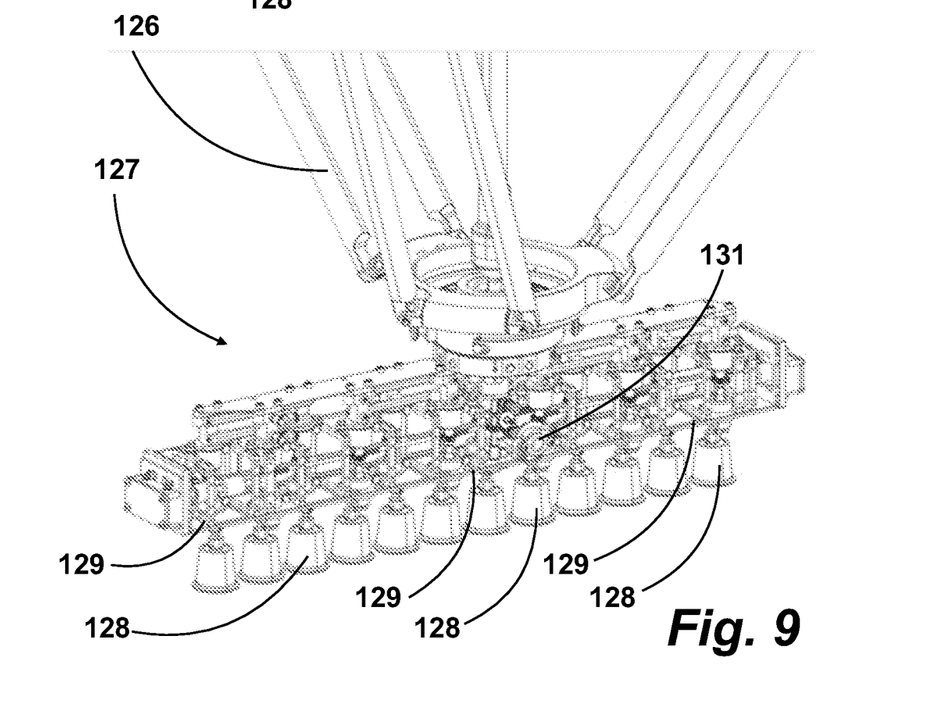
FIG. 9 shows a perspective and partial section view of the transfer device of FIG. 8.
Figure 10:
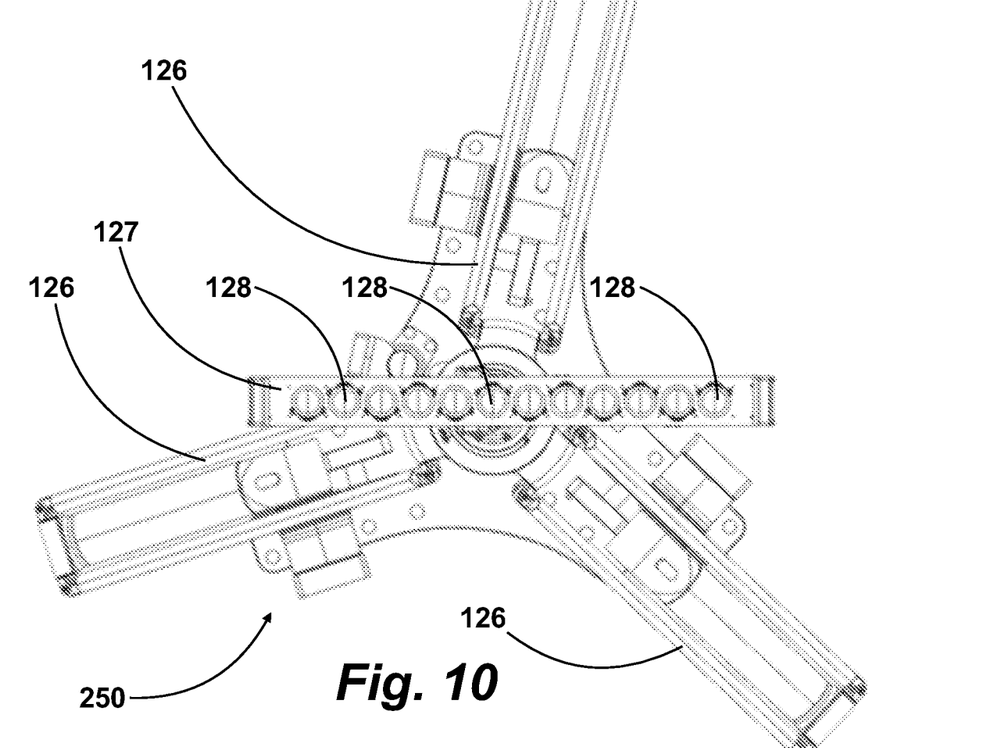
FIG. 10 shows a bottom view of the transfer device of FIG. 8, in a first operating configuration.
Figure 11:
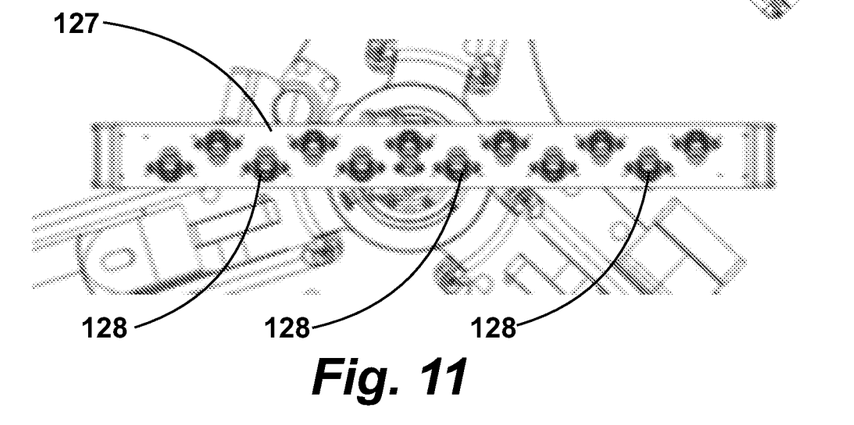
FIG. 11 shows a bottom view of the transfer device of FIG. 8, in a second operating configuration.

In the inlet section 101, the feeder device for articles to be packaged 300 comprises an inlet line 121 which, in this example, is formed by two inlet rows 121*a* and 121*b* (FIG. 4).

The inlet line 121 is connected to a start station 112, wherein the capsules 1 are arranged on said rows 121*a*, 121*b*, and wherein a start equipment regulates the passage of the capsules 1 based on feedback that takes into account the operating state of the devices of the following stations.

The feeder device 300 comprises an upturning equipment 301 and a spacer equipment 302 which will be described below in more detail, so that after the start station 112 the capsules 1 are spaced apart from each other, and the capsules of one of the rows of the inlet line 121 are upturned, so that the capsules 1 in that row are in an upturned arrangement.

In the present embodiment, the feeder device 300 comprises a first conveying line 113 having two rows 113*a*, 113*b* of capsules 1, one next to the other, of which one conveys capsules 1 in upright arrangement and the other conveys capsules 1 in upturned arrangement.

The rows 113*a*, 113*b* of the first conveying line 113 flank a transfer station 114, wherein the capsules 1 are transferred from the first conveying line 113 to respective rows 115*a*, 115*b* of a second conveying line 115, wherein the arrangements of single capsules 1 are arranged according to a predetermined pick-up pattern.

In the present example, the rows 115*a*, 115*b* of the second conveying line 115 are also two, and the preferred pick-up pattern is a checkerboard pattern, wherein each capsule 1 in upright arrangement is flanked on three of the sides thereof by capsules 1 in upturned arrangement, and vice versa, with appropriate spacing between capsules 1 in the same row.

Between the rows 113*a*, 113*b* of the first conveying line 113 and the rows 115*a*, 115*b* of the second conveying line 115 there are provided, in the transfer station 114 of the feeder device 300, a plurality of robotic transfer devices 251*a*, 251*b*, which are arranged in succession between the first and second conveying line 115, and supported by the cage frame 109 above, like for the filling devices.

In particular, there are two of them, i.e. one for each row 113*b*, 113*b* of the first conveying line 113.

These transfer devices 251*a*, 251*b* are provided to transfer a number of capsules 1 from a single row of the first conveying line 113, which will then be either all in upright arrangement or all in upturned arrangement. As described in more detail below, each transfer device has a respective gripping device 127 with a plurality of gripping elements 128 to each grip a single capsule 1 in any arrangement.

During the transfer, the gripping elements 128 move by staggering the capsules 1 that have been picked up from each other, so that they can be arranged on the second conveying line 115 in a position compatible with the pick-up pattern, which the transfer devices compose during their operation.

In more detail, the inlet line 121 is made up of a pair of first conveyor belts on which the capsules 1 travel in a single and continuous row, in contact with each other. At the inlet station 101, each capsule 1 is collected by the start station 112 which comprises a pair of accelerator belts 122, one for each conveyor belt, acting on the bottom and on the head of each capsule 1, so that they are sent to the packaging device 300 producing, downstream, a continuous advance flow.

From the accelerator belts 122, the capsules 1 are captured by the upturning equipment 301 and spacer equipment 302.

The upturning equipment 301 receives the capsules of a row 121*b* of the inlet line 121, and comprises a respective first cylindrical screw conveyor 123, rotating at a predetermined rotational speed, with a respective first groove 135 which is arranged according to a helix principle with an inlet end.

Thus, the first groove 135 receives the capsules 1 continuously. The upturning equipment 301 further comprises a first fixed guide 136, which cooperates with said first screw conveyor 123 to upturn the capsules 1.

For this purpose, the first fixed guide 136 extends in a helical shape around the first screw conveyor 123 with a spacing which is substantially equal to its length and an overall rotation angle of approximately 180°. In this manner, the capsules 1 are received by the first screw conveyor 123 at the inlet end thereof in an upright arrangement, and they are conducted by the first screw conveyor 123 along the first fixed guide 136 as far as an opposing outlet end thereof where the capsules 1 are released in upturned arrangement.

It will be noted that the upturning equipment 301 also acts as a spacer equipment, because the spacing between the capsules 1 exiting the first screw conveyor 123 is defined by the spacing of the first groove 135.

At the other row 121*a* of the inlet line 121, a spacer equipment 302 is envisaged which provides for spacing the capsules 1 from each other, but without upturning them. It comprises a respective second cylindrical screw conveyor 124, rotating at a predetermined rotational speed, with a respective second groove 137 provided according to a helix principle with an inlet end, which continuously receives the capsules 1, and an outlet end at which the capsules are uniformly equidistant. A corresponding second fixed guide 136*a*, extending substantially rectilinearly parallel to the axis of the second screw conveyor 124, is associated with the second screw conveyor 124.

Both the first screw conveyor 123 and the second screw conveyor 124 impart to each capsule 1 a predetermined acceleration at said inlet end, so as to space the capsules 1 from each other. This is achieved by continuously varying the helical spacing of the respective groove 135, 137.

The first screw conveyor 123 operates by continuously upturning the capsules 1 of a row 121*b* of the inlet line 121, or a part thereof: it is understood that the rows of the inlet line may be more than two and that more than one row of the inlet line 121 may be subject to the overturning of the articles to be packaged.

With this process, two corresponding rows 113*a*, 113*b* in the first conveying line 113 are obtained from the two rows of the inlet line 121, with capsules 1 in an upright arrangement and with capsules 1 in an upturned arrangement, respectively.

Each transfer device 251*a*, 251*b* comprises a set of three articulated support arms 126, which perform the function of a self-moving transfer arm.

The arm assembly 126 supports a gripping device 127 which is provided to grip the capsules 1 proceeding consecutively, from a section of a row of the first conveying line 113, operating so as to empty the first conveying line 113 progressively, thereby transferring all the capsules 1.

The capsules 1 are transferred to the two rows 115*a*, 115*b* of the second conveying line 115: it should be noted that the rows 113*a*, 113*b* of the first conveying line 113 and the rows 115*a*, 115*b* of the second conveying line are arranged parallel with and close to each other, one next to the other, and they have a concordant transport direction, whereas both the first and second conveying line 115 transport the capsules 1 continuously.

With reference to FIGS. 8 to 11, the gripping device 127 comprises a plurality of gripping elements 128, of the suction cup type. Each gripping element 128 is mounted on a respective independent arm 129, and all the arms 129 are connected to an eccentric drive 131, driven by an electric motor, which controls the simultaneous translation of all the gripping elements 128.

Therefore, they are movable, internally to the gripping device 127, between a first configuration (FIG. 10) in which they are aligned: in this configuration, each gripping element 128 is spaced from the others to precisely couple with the head, or the bottom, of the target capsule 1, belonging to that section of the first conveying line 113 from which a discrete set of capsules is picked up.

Once the gripping elements 128 have picked up the respective capsules 1, they simultaneously move in translation into a second configuration (FIG. 11) in which they are staggered to each other and, in this embodiment example, they form two rows that correspond, in terms of distance and spacing, to the rows 115*a* and 115*b* of the second conveying line 115. In this way, the capsules 1 picked up from a section of a single row of the first conveying line 113, thus all in an upright arrangement or all in an upturned arrangement, are deposited in alternating succession on the rows 115*a* and 115*b* of the second conveying line 115.

The capsules 1 picked up from a subsequent section of the first conveying line 113, for example by the other gripping device 127, are released on the rows 115*a* and 115*b* of the second conveying line 115 so as to fill it and complete the respective rows.

In this way, a checkerboard pattern is obtained on the second conveying line 115.

However, it is understood that, with simple mechanical adjustments on the arms 129, a wide range of target patterns can be achieved.

It should be noted that, in this transfer process, the capsules 1 are transferred with a direct transfer path, in which the capsules picked up from the first conveying line 113 are at least partially staggered to each other during their path and, without intermediate stops, are laid on the second conveying line 115 according to a predetermined pattern.

It should be noted that, in the light of the above, the number of rows 121*a*, 121*b* of the inlet line 121 coincides with the number of the rows 113*a*, 113*b* of the first conveying line 113 and the number of rows 115*a*, 115*b* of the second conveying line 115, i.e. two.

The second conveying line 115 is arranged parallel with the packagings conveyor 107; they move in counter-current with respect to each other.

On the side of the second conveying lines 115 opposite to the packagings conveyor 107, there is also provided a plurality of buffer plates 116, which are provided to receive any unpackaged capsules 1, i.e. discarded during the filling step for any reason whatsoever.

The above-mentioned robotic filling devices 200 operate by transferring the capsules 1 from the second conveying line 115 to the box-shaped packagings 30, or by moving the capsules onto the buffer plates 116.

Subsequently, the closed box-shaped packagings reach a discharge end 111, from where they are sent to a packaging apparatus.

To the above-described packaging apparatus and device and process for feeding articles to be packaged, a person skilled in the art may, to meet additional and contingent requirements, make numerous further modifications and variations, all of which are, however, within the scope of protection of the present invention as defined by the appended claims.

The invention claimed is:

1. A feeder device for articles to be packaged with a packaging apparatus, wherein the articles are configured to be transported on a first conveying line, the feeder device comprising:

at least one transfer device, to transfer the articles from said first conveying line to a second conveying line of the packaging apparatus, the at least one transfer device comprising a self-moving transfer arm, and a respective gripping device moved by said self-moving transfer arm, wherein the gripping device is configured to remove said articles, and comprises a plurality of gripping elements, each gripping element configured to pick up a single article of said articles, the gripping elements being mutually movable from a first configuration, where the gripping elements are aligned with each other along a single row to match a corresponding row of articles in said first conveying line, and to grip the articles of said corresponding row of articles from the first conveying line, to a second configuration, where at least two of the gripping elements are staggered with respect to each other, to lay the articles on the second conveying line according to a predetermined pattern.

2. The feeder device according to claim 1, further comprising:

an inlet section, configured to feed the articles through a number of inlet rows, each article having a same upright arrangement, and an upturning mechanism for continuously upturning the articles for some of said number of inlet rows to obtain, from said inlet rows, corresponding rows of the first conveying line with articles with said upright arrangement and rows of the first conveying line with articles with an upturned arrangement.

3. The feeder device according to claim 2, wherein said upturning mechanism comprises, for each inlet row in which the articles are upturned:

a screw conveyor rotating at a predetermined rotation speed, comprising a helical groove, an inlet end configured to continuously receive the articles from the inlet row, and a fixed helical guide, cooperating with said screw conveyor and extending around said screw conveyor over an angular extent of approximately 180°, to receive the articles in an upright arrangement and to release the articles in an upturned arrangement.

4. The feeder device according to claim 3, further comprising:

a spacer mechanism for feeding the articles, continuously and adjacent to each other, according to a predetermined spacing.

5. The feeder device according to claim 4, wherein said spacer mechanism comprises, at each inlet row:

a screw conveyor rotating at a predetermined rotation speed, comprising a helical groove, an inlet end, turns with a predetermined spacing to continuously receive the articles from a respective inlet row, and an outlet end at which the articles are spaced apart from each other.

6. The feeder device according to claim 5, wherein the conveying screws of the upturning equipment and the spacer equipment coincide.

7. The feeder device according to claim 2, wherein two inlet rows and two corresponding rows of the first conveying line are provided, said upturning equipment acting on one of said inlet rows.

8. The feeder device according to claim 2, wherein the number of inlet rows coincides with the number of conveying rows of the second conveying line.

9. The feeder device according to claim 1, wherein said pattern is a checkerboard pattern.

10. The feeder device according to claim 1, wherein said first conveying line and said second conveying line are arranged parallel with and close to each other.

11. The feeder device according to claim 10, wherein said first conveying line and said second conveying line have a concordant transport direction.

12. The feeder device according to claim 1, wherein said first and second conveying lines transport the articles in a continuous manner.

13. A packaging apparatus comprising the feeder device according to claim 1.

14. A process for feeding articles to be packaged, the articles being transported on a first conveying line to be fed to a respective second conveying line, the process comprising:

a transfer step wherein a number of said articles are picked up in a single row from said first conveying line to be transferred to said second conveying line through a direct transfer path, wherein the articles are at least partially staggered with respect to each other along different rows, to be laid on said respective second conveying line according to a predetermined pattern.

15. The process according to claim 14, wherein each article is fed to said first conveying line on a number of inlet rows in a same arrangement, the process comprising:

an upturning step of upturning the articles conveyed by some of said number of inlet rows, resulting, in said first conveying line, in rows of articles in an upright arrangement and rows of articles in an upturned arrangement.

16. The process according to claim 15, wherein said articles, in said inlet rows, are fed continuously, the process comprising:

a spacing step of uniformly spacing apart the articles in said first conveying line.

17. The process according to claim 15, wherein the number of inlet rows coincides with the number of rows in the second conveying line.

18. The process according to claim 17, wherein two inlet rows and two conveying rows are provided in the first conveying line, and the upturning step is performed by acting on one of the inlet rows.

19. The process according to claim 14, wherein, in the first and in the second conveying lines, the articles are transported in a continuous manner.

20. The process according to claim 14, wherein said pattern is a checkerboard pattern.

21. The process according to claim 17, wherein said upturning step is performed at the same time.

* * * * *